United States Patent [19]
Nakanishi et al.

[11] Patent Number: 4,821,059
[45] Date of Patent: Apr. 11, 1989

[54] ELECTRIC CAMERA

[75] Inventors: Kazuhiro Nakanishi; Yasushi Hoshino, both of Hachioji, Japan

[73] Assignee: Konishiroku Photo Industry Co., Ltd., Tokyo, Japan

[21] Appl. No.: 153,494

[22] Filed: Feb. 3, 1988

Related U.S. Application Data

[63] Continuation of Ser. No. 860,089, May 6, 1986, abandoned.

[30] Foreign Application Priority Data

| May 10, 1985 | [JP] | Japan | 60-99941 |
| May 10, 1985 | [JP] | Japan | 60-99942 |
| May 10, 1985 | [JP] | Japan | 60-99943 |
| May 10, 1985 | [JP] | Japan | 60-99944 |
| May 10, 1985 | [JP] | Japan | 60-99945 |
| May 10, 1985 | [JP] | Japan | 60-99946 |
| May 10, 1985 | [JP] | Japan | 60-99947 |
| Jun. 4, 1985 | [JP] | Japan | 60-122245 |

[51] Int. Cl.⁴ .......................... G03B 1/00; G03B 3/00; G03B 5/00; G03B 15/02
[52] U.S. Cl. .................. 354/400; 354/173.1; 354/195.1; 354/202; 354/149.11; 354/214
[58] Field of Search ............ 354/400, 419, 126, 145.1, 354/149.11, 171, 173.1, 173.11, 187, 195.1, 202, 214, 234.1, 235.1, 402, 288, 195.12

[56] References Cited

U.S. PATENT DOCUMENTS

| 4,258,998 | 3/1981 | Lermann et al. | 354/214 X |
| 4,261,658 | 4/1981 | Uchiyama et al. | 354/187 X |
| 4,294,527 | 10/1981 | Hashimoto et al. | 354/173.1 X |
| 4,336,986 | 6/1982 | Prochnow | 354/195.1 X |
| 4,472,042 | 9/1984 | Iwata et al. | 354/419 X |
| 4,515,453 | 5/1985 | Wakabayashi et al. | 354/149.1 |
| 4,601,563 | 7/1986 | Miyawaki et al. | 354/173.1 X |
| 4,619,510 | 10/1986 | Nakanishi | 354/214 X |
| 4,724,450 | 2/1988 | Miyawaki et al. | 354/173.1 |

FOREIGN PATENT DOCUMENTS 202828 11/1986 European Pat. Off. ....... 354/195.12

Primary Examiner—W. B. Perkey
Attorney, Agent, or Firm—Jordan B. Bierman

[57] ABSTRACT

A motor driven camera in which a reversible motor is used to wind and rewind the film, and to perform some reciprocative camera function. The camera is constructed so that film will be wound in the forward direction of the motor. The reciprocative camera function is performed by reversing the direction of the motor. An additional shifting step is necessary to rewind the film, the film being rewound when the motor is in the reverse mode and the shifting step is completed. Examples of reciprocative camera functions include lens focus, and retracting a flash or lens cover.

17 Claims, 10 Drawing Sheets

A. LENS SLIDING

B. FILM REWINDING

ELECTRIC CAMERA

This application is a continuation of application Ser. No. 860,089, filed May 6, 1986, now abandoned.

BACKGROUND OF THE INVENTION

The present invention relates to a camera of the type wherein the functions of film-winding, film-rewinding and other mechanisms are driven by a single motor.

In a recent small-sized camera especially in a compact type camera, an automation of camera functions and operations has been promoted following the automation of exposure and focusing and at the present time there are offered cameras having therein a small but highly efficient motor that performs automatically the operations of film-winding, film-rewinding and shutter-setting through only the switch operation.

As a structure of a driving system in these cameras, a changeover both of the rotating direction of a motor and a simple clutch mechanism causes a camera to perform aforesaid film-winding, film-rewinding and shutter-setting operations, accordingly, when an independent function should be added to the camera, the mechanisms for power transmission and switch-over for aforesaid additional function should be provided separately, which has caused disadvantages that the structure and operations of a camera are complicated.

For the materialization of a camera wherein an operation such as a changing operation of a focal length that is completely different from film-winding and film-rewinding operation should also be performed by one motor, there is desired a novel power transmission device which is simple in structure and is efficient with a little loss of power and further is easy to operate without an erroneous operation.

Furthermore, when the lens shifting necessary for aforesaid changing of a focal length is added to a camera as a camera action other than film transportation and when the lens shifting is intended to be performed by aforesaid motor, one part of aforesaid driving system should be separately used in two systems. Therefore, the changeover operation of the driving mechanism for the foregoing is necessary and the control circuit for controlling rotation time of the motor for the aforesaid changeover operation is concurrently needed to be switched.

For the switching of the control circuit, it may be considered that an exclusive switch is provided for each of film transportation and lens shifting and thereby the switching of the control circuit is performed by actuating either one of aforesaid exclusive switches. However, because of two operating switches provided, erroneous operation tends to take place and the controlling device tends to be bulky and expensive partly because of the increase in the number of inputs, which results in the cost increase of a camera.

The present invention, after the solution of aforesaid problems and the improvement, is to provide a camera wherein a film-rewinding operation or an operation of changing a focal length can be conducted from the state of film-winding only by operating either one of film-rewinding member and the operating member for changing a focal length through controlling the motor rotation in one direction into two driving systems by means of a comparatively small-sized controlling device that is free from a fear of an erroneous operation.

SUMMARY OF THE INVENTION

In the construction of the invention, two clutch levers each of which is provided with a planetary gear that revolves around the axis of said clutch lever according to each direction of motor rotation, are provided and when the motor makes a regular turn, aforesaid planetary gear engages with a film-winding reel gear and a sprocket gear respectively and transmits their rotation operations for film-winding, while when the motor is switched to make a reverse turn, the swing of the first clutch lever caused by the revolution of aforesaid planetary gear is fixed to a desired position and simultaneously the planetary gear on the second clutch lever engages with a lens-shifting gear for changing a focal length and the rotation of the planetary gear on its own axis is transmitted for the lens shifting, or the swing of the second clutch lever is fixed to a desired position and simultaneously the planetary gear on the first clutch lever engages with a film-rewinding gear and the rotation of the planetary gear on its own axis is transmitted for the film-rewinding. The present invention is attained by a camera capable of winding a film, rewinding a film and performing other action with a single motor, wherein two clutch systems each of which employing a clutch lever that swivels on its own axis accompanying with the revolution of the planetary gear and switches power transmission depending on the rotation direction, are provided and thereby the power transmission for film-winding, film-rewinding or for owther action is selectively made.

In order to cause a camera to perform a plurality of camera actions with one motor rotating in one direction by means of a comparatively small-size controlling device that is free from the fear of an erroneous operation, the camera is so constituted that each start of the motor for aforesaid plural camera actions is made by a single switch and a film-winding reel gear is latched by a latching member for pawling to prevent a film from slacking which, for film-rewinding, is pulled back for releasing aforesaid reel gear from pawling concurrently with the actuation of the locking mechanism that prevents an operation for lens shifting.

In the changeover to film-winding or to film-rewinding after lens shifting when the rotation of the motor is converted to the straight reciprocating motion for the action of lens shifting the constitution is so made that the motor is switched off at the position which is beyond the extreme point of aforesaid reciprocating motion for stopping the motor rotation at the point where the load applying on aforesaid lens driving gear exceeds the maximum value and thereby reducing the engaging pressure under a stationary state between aforesaid planetary gear and aforesaid lens driving gear for the purpose that the planetary gear on aforesaid second clutch lever can easily be disengaged from aforesaid lens driving gear. Further, it is possible to achieve a camera that is easy to operate and is free from the fear of an erroneous operation through the constitution wherein the power transmission system may be switched from the state of film-rewinding to the state capable of shifting the lens by opening a back lid of a camera for loading the fresh film or by operating an operating member especially provided.

DETAILED DESCRIPTION OF THE PREFERRED EMBODIMENTS

Figure 1:
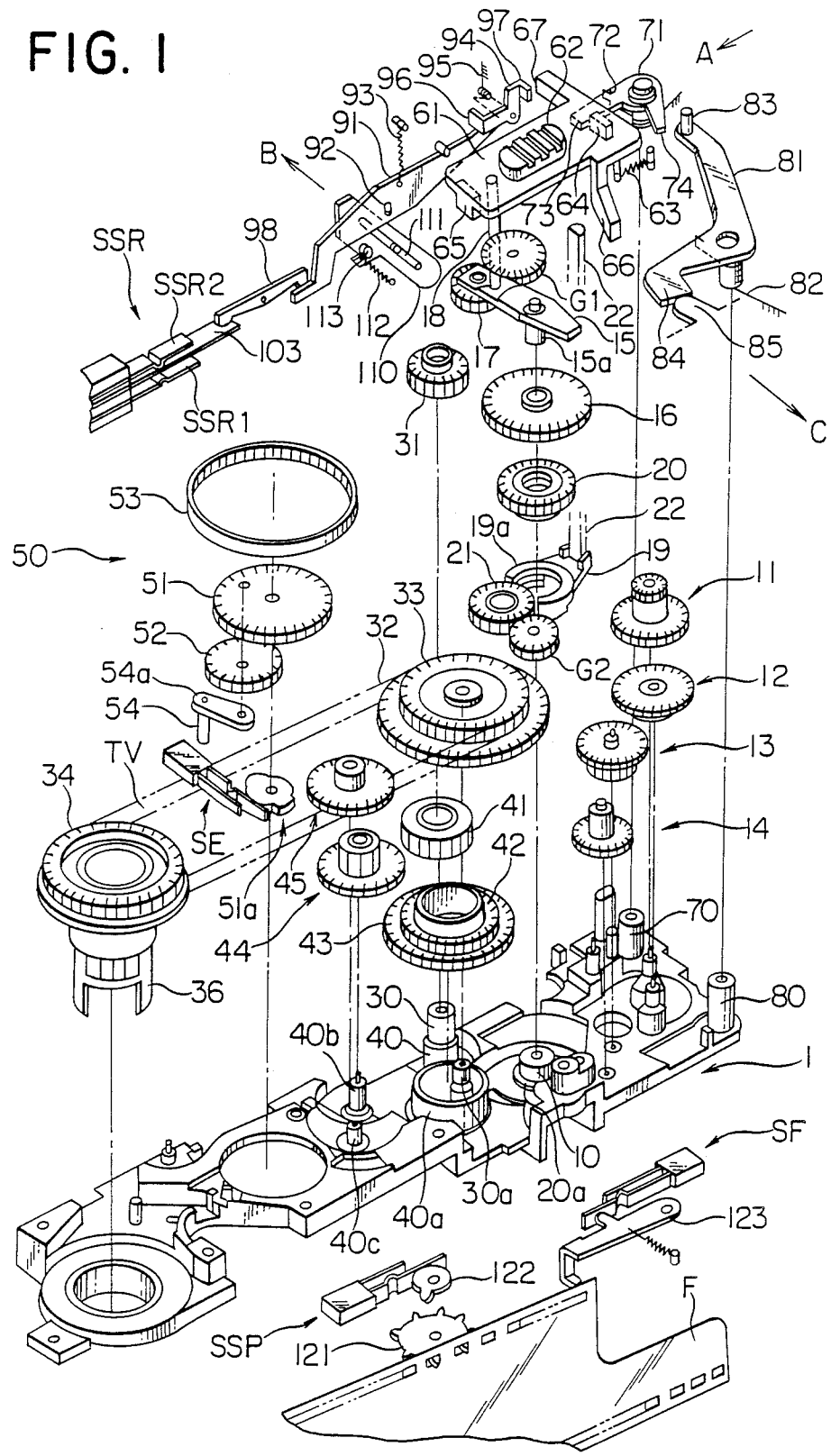
FIG. 1 is a perspective view wherein a bottom cover of a camera body and its surrounding portion are viewed from the side of a back lid and each structural member is developed on its attaching position for illustration.

FIG. 1 is a perspective view wherein a bottom cover of a camera body and its surrounding portion are viewed from the side of a back lid and each structural member is developed on its attaching position for illustration.

The notation 1 represents a bottom plate forming a bottom portion of a camera body and it is combined in one body with a camera body after illustrated structural members are assembled on the bottom plate, and thus each driving system is connected functionally.

The notations 11, 12 and 13 are a combination of a large gear (or whell gear) and a small gear (or pinion gear) united in one body and each of them is rotatably mounted on a shaft or in a bushing on aforesaid bottom plate and they represent a reduction gear train wherein a gear (not illustrated) on the motor shaft engages with a large gear of gear 11 and a small gear of gear 11 engages with a large gear of gear 12 and further a samll gear of gear 12 engages with a large gear of gear 13 successively.

The notations 15 and 19 are the first clutch lever and the second clutch lever mounted respectively around the shafts 10 and 20a. On the rotation center portion 15a of the first clutch lever 15, gear 16 that engages with a small gear of aforesaid gear 13 is mounted and on the edge portion of the first clutch lever, planetary gear 17 that engages with the gear 16 is mounted, while on the rotation center portion 19a of the second clutch lever 19, gear 20 that engages with a small gear of aforesaid gear 13 through intermediate gear 14 is mounted and on the edge portion of the second clutch lever, planetary gear 21 that engages with the gear 20 is mounted.

Namely, the clutch mechanism is so constituted that aforesaid planetary gears 17 and 21 rotate in the opposite direction each other because aforesaid gears 16 and 20 are driven in the opposite direction each other by the rotation of the motor, and concurrently with the rotation of the planetary gears 17 and 21, they revolve in the opposite direction to that of their rotation, thus aforesaid first and second clutch levers 15 and 19 are swiveled and thereby the power transmission systems are switched.

The notations 18 and 22 are stud pins planted in aforesaid first and second clutch levers 15 and 19 respectively and aforesaid clutch mechanisms are controlled by regulating the positions of the stud pins as explained later.

The notations 31 and 41 are a rewinding gear and a lens driving gear mounted rotatably in any direction on shafts 30 and 40 on aforesaid bottom plate respectively and the rewinding gear 31 engages with rewinding large gear 32 mounted on shaft 30a and the lens driving gear 41 engages with lens driving large gear 42 mounted on shaft 40a.

The notations 33 and 34 are the pulleys for a timing belt and when the pulley 33 that is united, on a coaxial basis, with aforesaid large gear for rewinding 32 is rotated, aforesaid pulley 34 is driven through the timing belt TV and the clutch for film-rewinding 35 that is united, on a coaxial basis, with aforesaid pulley 34 is rotated for film-rewinding.

The notation 43 is a gear united with aforesaid lens-driving large gear 42 on a coaxial basis and the gear 43 engages with a large gear of gear 44 mounted on shaft 40b, a small gear of the gear 44 engages with a large gear of gear 45 mounted on shaft 40c and then the gear 45 engages with driving gear 51 of planetary gear device, thus these gears 43, 44 and 45 form a reduction gear train.

Aforesaid planetary gear device 50 is an example of a driving system for performing an action of a camera and it serves as a device for lens sliding as a method of lens shifting for changing a focal length in the present example.

In the present example, a focal length of a picture-taking lens is changed by inserting the conversion lens in an optical axis or withdrawing it from the optical axis through the movement of a lens barrel in the direction of the optical axis, namely, through the actions of extending or collapsing the lens barrel. Therefore, a driving member whose traveling stroke in the optical axis is relatively great is needed for changing a focal length and the present example shows an example wherein aforesaid stroke is obtained from driving pin 54.

Namely, in the constitution of the aforesaid example, when aforesaid driving gear 51 rotates, planetary gear 52 mounted eccentrically on the driving gear 51 revolves and rotates concurrently while engaging with fixed internal gear 53 having a pitch circle diameter that is twice that of aforesaid planetary gear 52 and causes aforesaid driving pin 54 mounted through attaching plate 54a on a pitch circle of aforesaid planetary gear 52 to make a straight-line motion in the stroke corresponding to the pitch circle diameter of aforesaid internal gear 53 from the illustrated position in the direction of the optical axis of a camera.

On the other hand, the upper side of aforesaid bottom plate 1 on which aforesaid driving members are assembled is covered by a partition plate (not illustrated) on which the operating members explained below are attached.

The notation 61 is a film-rewinding button capable of sliding in the direction of an arrow A on aforesaid partition plate and it is operated by ratchet knob 62 exposed on a camera against tension spring 63 and aforesaid film-rewinding button 61 is equipped with protrusions 64, 65 and 66 through aforesaid partition plate on the bottom surface thereof and is equipped with a protrusion 67 on its side.

Aforesaid protrusion 64 stops in a state wherein it contacts the side of first protrusion 73 of hook lever 71 mounted on shaft 70 on aforesaid bottom plate 1 and biased counterclockwise by torsion spring 72, and aforesaid protrusion 65 occupies a position that is at a short distance from stud pin 18 on aforesaid first clutch lever 15 and further aforesaid protrusion 66 is positioned at a location considerably far from stud pin 22 on aforesaid second clutch lever 19.

On the other hand, second protrusion 74 on aforesaid hook lever 71 occupies a position close to pin 83 on releasing lever 81 mounted on shaft 80 on aforesaid bottom plate 1 and biased counterclockwise by torsion spring 82, but aforesaid second protrusion 74 and aforesaid pin 83 are kept slightly apart each other because tip 84 of aforesaid releasing lever 81 is held by protrusion 85 of a back lid (not illustrated) in a closed position against a camera body.

The notation 91 is a switch lever biased by tension spring 93 counterclockwise around a fulcrum of bearing hole 92 on the side of aforesaid partition plate and its right side edge portion holds bell crank 94 mounted around a shaft on the side of aforesaid partition plate and biased counterclockwise by weak torsion spring 95 by supporting the bent portion 96 of the bell crank 94, while the left side edge portion of the switch lever contacts the right side edge of swing lever 98 mounted around a shaft on the same side.

Figure 2:
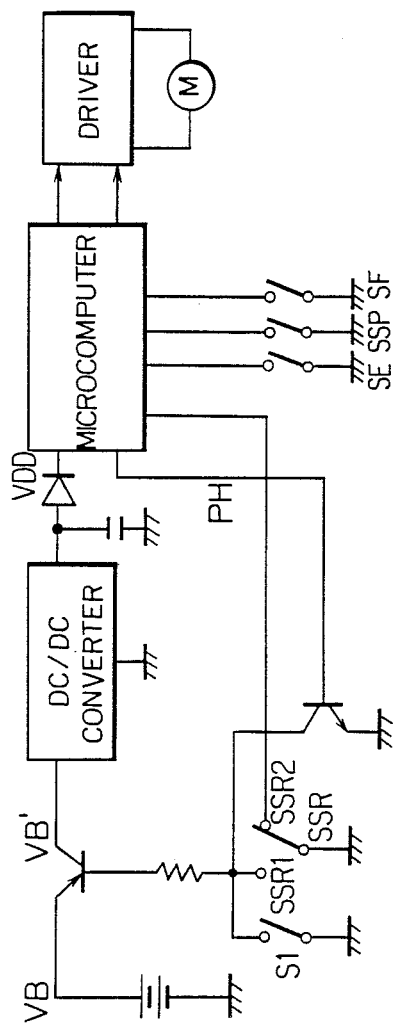
FIG. 2 shows a controlling circuit for motor M.

SSR is a switch actuated by one cycle of a swing of aforesaid swing lever 98 and its contact blade 103 is pressed down and it leaves contact point SSR2 and again contacts aforesaid contact point SSR2 after it contacts instantaneously contact point SSR1, which may instruct a microcomputer shown in FIG. 2 to cause motor M to make a reverse turn.

The notation 110 is a lens-sliding button capable of being operated from outside of a camera like aforesaid film-rewinding button 62 and when it is slid in the direction of an arrow B being guided by slot 111 against tension spring 112, pin 113 planted thereon hits aforesaid switch lever 91 and causes it to rotate clockwise.

SE is a switch that is turned on at a position where cam 51a united with aforesaid driving gear 51 on a coaxial basis rotates slightly and is turned off at both end positions of aforesaid straight-line motion of aforesaid driving pin 54, namely the positions where a picture-taking lens is set either at a long focal length distance or at a short focal length distance, and signals for those ON and OFF are to be inputted in aforesaid microcomputer.

In the film chamber of a camera, on the other hand, driving sprocket 121 that engages with a perforation of film F and is rotated by the movement of aforesaid film F and cam 122 capable of rotating together with the driven sprocket are provided. The movement of aforesaid film F during film-winding or film-rewinding causes cam 122 to turn on or turn off switch SSP each time the film is moved by a distance equivalent to one frame and the signals for turning on or off are to be inputted to aforesaid microcomputer. Furthermore, film detecting lever 123 that detects the trailing edge of the rewound film is also provided and the signals for switch SF that is turned off when the rewinding of film F is completed, are to be inputted in aforesaid microcomputer.

FIG. 2 shows a controlling circuit for motor M controlled by aforesaid switches in an electric camera of the invention.

Each operation of film-winding, film-rewinding and lens-sliding in the invention and each action caused by the operation will be explained as follows.

In FIG. 1, the motor makes a regular turn clockwise when the release button of a camera is depressed and thereby aforesaid gear 11 rotates counterclockwise, gear 12 rotates clockwise and gear 13 rotates counterclockwise.

Namely, in FIG. 2, when the release button is returned after the shutter is actuated by pushing the release button, switch S1 is turned on and the power source circuit is connected and the microcomputer instructs the driver to cause motor M to make a regular turn.

Therefore, aforesaid gear 16 engaging with aforesaid gear 13 rotates clockwise and turns aforesaid first clutch lever 15, that is frictionally connected to aforesaid gear 16, to clockwise thereby causing aforesaid planetary gear 17 to engage with reel gear G1 for film-winding. Then, aforesaid planetary gear 17 that is being rotated counterclockwise by aforesaid gear 16 causes aforesaid reel gear G1 to rotate clockwise for film-winding.

On the other hand, aforesaid gear 13, since it is rotating aforesaid gear 20 counterclockwise through aforesaid intermediate gear 14 at the same time, turns aforesaid second clutch lever 19 frictionally connected to aforesaid gear 20 counterclockwise also, thereby causing aforesaid planetary gear 21 to engage with sprocket gear G2. Then, aforesaid planetary gear 21, since it is being rotated clockwise by aforesaid gear 20, rotates aforesaid sprocket gear G2 counterclockwise for film-transportation that convey a film on the passage thereof.

Namely, the film, after being transported by sprocket gear G2, is taken up with its reverse side up on a take-up reel (not illustrated) and the signal detected from the angle of rotation of sprocket 121 causes the motor to stop rotating, thus the film is wound by a distance equivalent to one frame of film.

Then, in the state of FIG. 1, when aforesaid lens-sliding button 110 is slid in the direction of an arrow B, its pin 113 turns clockwise aforesaid switch lever 91 whose left end portion then turns aforesaid swing lever 98 counterclockwise. thus aforesaid contact blade 103 is pressed down. Therefore, releasing aforesaid lens-sliding button 110 from being held causes switch SSR to operate as stated above and thereby the motor starts making a reverse turn.

As a result of the foregoing, aforesaid gear 16 rotates counterclockwise and it causes aforesaid first clutch lever 15 to turn also counterclockwise and it is finally held by protrusion 65 on aforesaid film-rewinding button 61 which is hit by aforesaid stud pin 18 in the state wherein aforesaid planetary gear 17 is disengaged from aforesaid reel gear G1. Therefore, aforesaid planetary gear 17 rotates idle at its position without transmitting its rotation to any driving system.

While, at the same time, aforesaid gear 20 rotates clockwise and it causes aforesaid second clutch lever 19 to rotate also clockwise and thereby aforesaid planetary gear 21 disengages from aforesaid sprocket gear G2 and aforesaid stud pin 22 moves toward protrusion 66 of aforesaid film-rewinding button 61 but before the stud pin 22 hits the protrusion 66, aforesaid lens-driving gear 41 is engaged with the planetary gear 21, thus the stud pin 22 does not contact the protrusion 66 in the case of lens-sliding.

Therefore, the rotation of a motor is transmitted to aforesaid planetary gear device 50 through aforesaid lens-driving gear 41 and further through aforesaid lens-driving large gear 42, aforesaid gears 43, 44 and 45.

The straight-line motion of aforesaid driving pin 54 in aforesaid planetary gear device 50 causes the actions of collapsing and extending the lens barrel and thereby changes a focal length of a picture-taking lens, and the rotation of aforesaid driving gear 51 causes a high-level signal caused by turning aforesaid switch SE on to be inputted in a microcomputer and as a result of that, the microcomputer is instructed to wait for a low-level signal caused by turning aforesaid switch SE off, thus the signal of OFF actuated by aforesaid cam 51a at a position where aforesaid driving gear 51 makes a half turn, instructs the driver to cause motor M to stop its reverse turn.

After this, therefore, when the release button is depressed for actuating the shutter and thereby aforesaid switch S1 is turned on, aforesaid motor M makes its regular turn again to be in the state capable of winding a film.

In the state of FIG. 1, on the other hand, when aforesaid film-rewinding button 61 is slided in the direction of an arrow A, aforesaid protrusion 64 is released from being held by first protrusion 73 on aforesaid hook lever 71 and thereby it causes second protrusion 74 to contact pin 83 on aforesaid releasing lever 81 to be in the state of halt. Therefore, even if aforesaid film-rewinding button 61 is released from being held by a finger, protrusion 64 is supported by aforesaid first protrusion 73 and thereby aforesaid film-rewinding button 61 is held at the position to which it has been slided.

Under the condition of the foregoing, aforesaid protrusion 65 is located far from stud pin 18 of aforesaid first clutch lever 15 not to interfere the swinging movement of the stud pin 18, while other protrusion 66 is located slightly close to stud pin 22 of aforesaid second clutch lever 19 to interfere partially the range of the swinging movement of the stud pin 22.

When aforesaid film-rewinding button 61 is further slided in the direction of an arrow A from the state of the foregoing, aforesaid protrusion 67 pushes bent portion 97 of aforesaid bell crank 94 and thereby causes the bell crank 94 to rotate counterclockwise dand also causes other bent portion 96 to swivel aforesaid switch lever 91 clockwise.

As a result of the foregoing, when aforesaid film-rewinding button 61 is released from being held by a finger, aforesaid switch SSR is actuated like the occasion of aforesaid lens sliding and the motor starts its reverse turn. Therefore, aforesaid first clutch lever 15, after leaving aforesaid reel gear G1, makes more rotation counterclockwise than that in lens sliding and causes aforesaid planetary gear 17 to engage with aforesaid film-rewinding gear 31 and thereby causes the film-rewinding gear 31 to rotate counterclockwise.

Aforesaid film-rewinding large gear 32 and aforesaid pulley 33, therefore, rotate clockwise and drive aforesaid pulley 34 through timing belt Tv and thus cause aforesaid film-rewinding clutch 35 united in one body on a coaxial basis with the pulley 34 to rotate clockwise to be in the state of film-rewinding.

On the other hand, aforesaid second clutch lever 19 swivels clockwise and causes aforesaid planetary gear 21 to disengage from aforesaid sprocket gear G2 and further tries to swivel clockwise, but in that location, aforesaid protrusion 66 is in a position where it holds aforesaid stud pin 22, therefore aforesaid planetary gear 21 rotates idle without transmitting its rotation to any driving system.

Thus, film F starts to be re-wound and alternate signals at high-level and low-level caused by ON and OFF of aforesaid switch SSP are inputted in the microcomputer by the rotation of aforesaid driven sprocket 121 and cam 122. As a result of that, the microcomputer is instructed to wait a high-level signal caused by OFF of aforesaid switch SF, and when aforesaid film-detecting lever 123 swivels after the end of film F passes the film-detecting lever 123 and thereby film-rewinding is terminated, the signal from aforesaid switch SF is inputted in the microcomputer and it instructs the driver to stop the reverse turn of motor M.

When the back lid of a camera is opened after motor M stops running, protrusion 85 on the back lid retreats in the direction of an arrow and thereby aforesaid releasing lever 81 turns counterclockwise and aforesaid pin 83 pushes second protrusion 74 on aforesaid hook lever 71 to cause the hook lever 71 to turn clockwise.

With opening of the back lid, therefore, aforesaid film-rewinding button 61 returns to the position shown in FIG. 1 again and when the back lid is closed after loading the next film, the film-rewinding button 61 enters the state wherein it is operated again by the operation of the lens-sliding button.

As is clear in aforesaid description, in the constitution of a camera of the invention, the range of revolution of either one of aforesaid planetary gear 17 or 21 revolving in accordance with a turning direction of a motor can alternately be restricted by an operation of film-rewinding button 61 or lens-sliding button 110, and thereby the rotation action of aforesaid planetary gear 17 or 21 caused by the reverse turn of the motor is transmitted to aforesaid film-rewinding gear 31 or to aforesaid lens-driving gear 41 and thus a camera selectively carries out film-rewinding or changing a focal length. An object of the invention may be attained by simple parts in a small amount and the power-transmission mechanism in a camera is compact and only the operations of exclusive operation buttons are required, therefore a camera may be equipped with a power-transmission mechanism which causes no fear of erroneous operations and is useful to a great extent.

Figure 3:
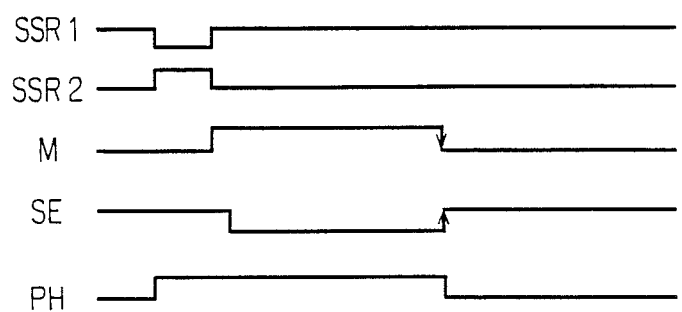
FIG. 3 represents a time chart showing the sequence of the controlling circuit.
Figure 3:
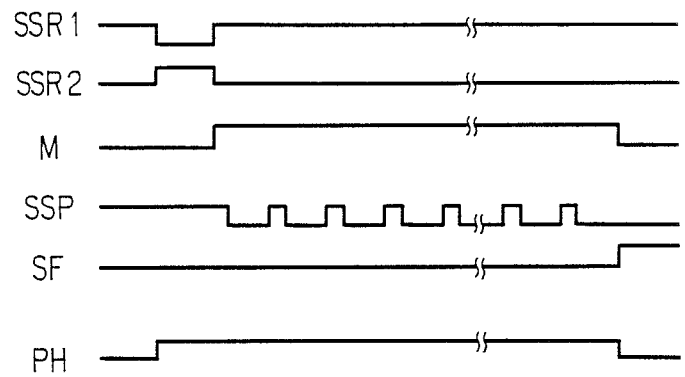

Next, FIG. 3 represents a time chart showing the sequence of the controlling circuit for the lens-sliding action and the film-rewinding action described above. A power-holding time for the reverse turn of the motor for each action is shown by the chart showing with a symbol PH.

Figure 4:
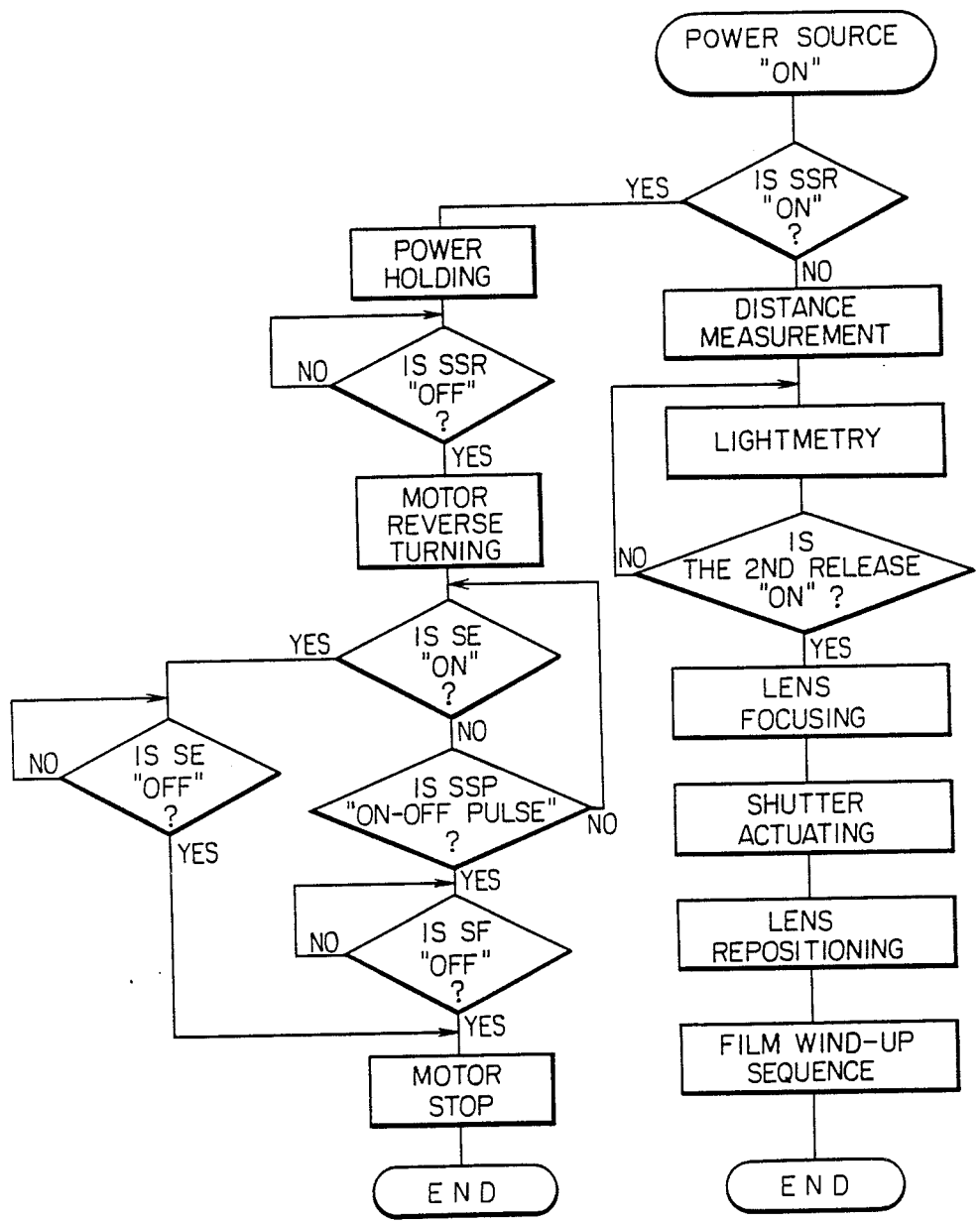
FIG. 4 is a flow chart of the function of an electric camera of the invention.

FIG. 4 is a flow chart of the functions of an electric camera of the invention and each function is carried out in the following sequence.

Under the condition that batteries are loaded in a camera and the power source is ready to be "ON", when switch SSR is not turned on (when switch SSR is not operated), the camera is ready for photographing. Therefore, the first step of the stroke of the release button causes the power source to be turned on and causes functions of distance measurement and photometry to function and then the second step of the stroke, namely the second releasing causes a lens-driving for the adjustment of focal length and a shutter-driving based on the results of photometry, thus the exposure is completed. Being caused by the returning of the releasing button after the exposure, an action of the lens to return to its original position and a film-winding action are carried out, thus a photographing cycle for one frame is completed.

On the other hand, when switch SSR is turned on (switch SSR is operated), the power source is turned on and the circuit of power source and that of the microcomputer are connected and even if SSR is turned off (SSR is returned to its initial state), the circuit is in the state of power-holding and the state wherein a current for reverse turn of the motor is supplied from the microcomputer to the motor continues to exist.

When switch SE is turned on under the step of the foregoing, it is judged as a sequence of lens-sliding, and OFF of switch SE, namely an action of collapsing or extending a lens barrel is completed and the motor is stopped by OFF of switch SE.

Under the step of the foregoing again, when switch SE is not turned on and switch SSP repeats the signals of ON-OFF, it is judged as a sequence of film-rewinding and the motor is stopped running by OFF of switch SF, namely the passage of the film end.

Namely, the control device such as a microcomputer monitors each action of lens-sliding and film-rewinding through a monitoring means such as switches. Aforesaid motor, after its start, is controlled by the control device such as a microcomputer or the like by means of signals from the monitoring means such as switches.

An electric camera of the invention is characterized in that the regular turn of the motor is for film-winding and the reverse turn is used for lens-sliding and film-rewinding, and any one action thereof can be started by changing over a single switch and a sequence of reverse turns of a motor corresponding to each of aforesaid actions is composed of switch signals obtained from aforesaid each action, and as a result of that, only one switch for changing over the turning direction is required and therefore, the microcomputer is allowed to be small in scale, which offers to a compact camera advantages both from economical and spacewise viewpoints.

In working of the invention, when the lens-sliding action is followed by other action, there is an occasion wherein smooth changeover to other action may not be achieved because planetary gear 21 of aforesaid second clutch lever 19 is hard to be disengaged from aforesaid lens-driving gear 41 for the reasons mentioned below.

Namely, it is generally preferable that the working range of driving pin 54 in aforesaid planetary gear device 50 is larger to some extent than the necessary amount for sliding of a lens unit.

Figure 5:
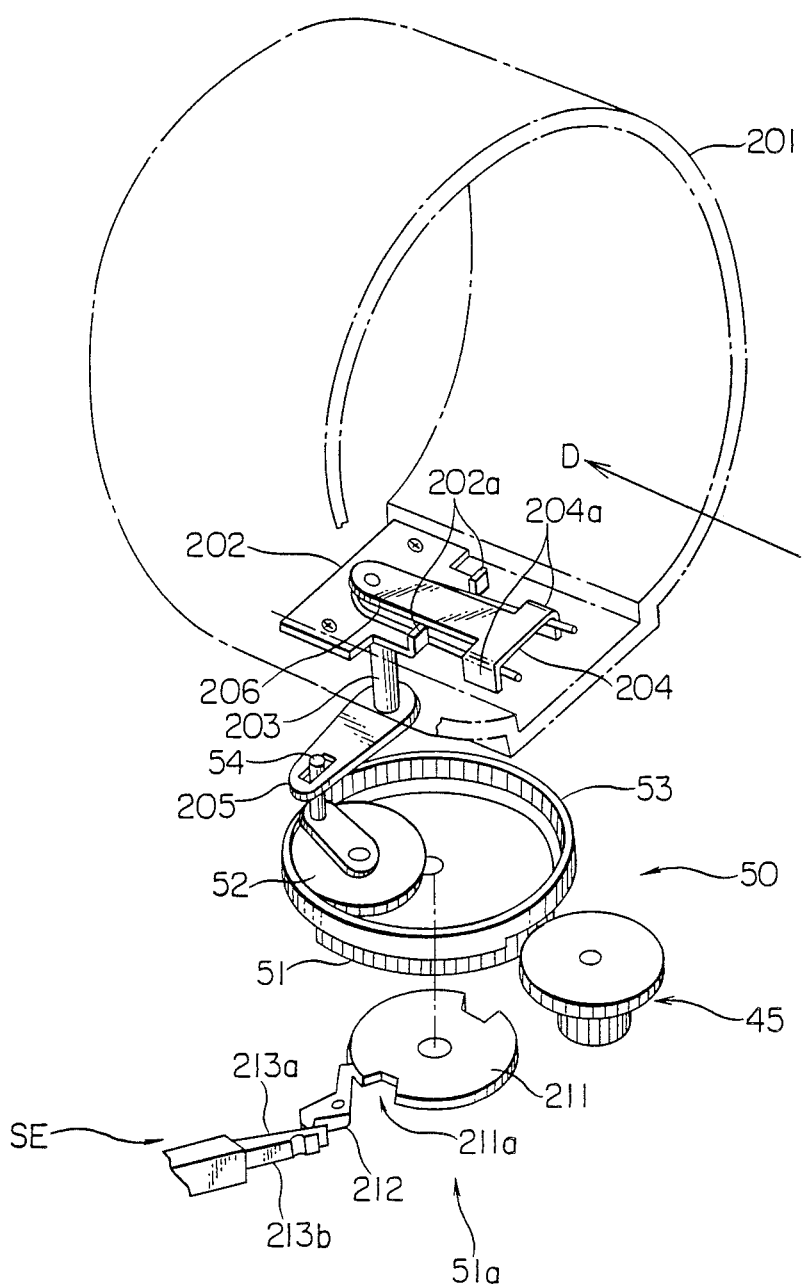
FIG. 5 shows an example of a device that absorbs a driving force in converting rotating motion to reciprocating motion.

Therefore, after changing to a necessary focal length and after the lens sliding is forcibly stopped, a device that absorbs a driving force of aforesaid planetary gear device 50 should be considered and an example thereof is shown in FIG. 5.

The notation 201 is a lens unit provided with a picture-taking lens having two kinds of focal lengths (not illustrated) and plate 202 having a pair of vertically upward bent portions 202a is fixed on the bottom inside the lens unit and shaft 203 is pierced together with the plate 202 so that the shaft 203 can whirl freely.

On the upper end of aforesaid shaft 203, lever 204 having a pair of vertically downward bent portions 204a is fixed and on the lower end thereof, namely, the outside of aforesaid lens unit 201, crank 205 is fixed at an angle of almost 90° against aforesaid lever 204 and the crank 205 can whirl freely together with aforesaid lever 204 around aforesaid shaft 203.

The notation 206 is a torsion spring that absorbs the stroke of working amount of driving pin 54 that exceeds the necessary sliding distance of aforesaid lens unit, and it is wound around aforesaid shaft 203 and both ends thereof are held by aforesaid vertically upward bent portions 202a and by aforesaid vertically downward bent portions 204a so that it is biased and it holds aforesaid lever 204 at its well-balanced position without deflecting to the right or the left.

FIG. 5 shows a situation wherein the clockwise rotation of aforesaid lens-driving gear 41 causes driving gear 51 of aforesaid planetary gear device 50 to rotate clockwise and causes aforesaid driving pin 54 to move straight in the direction of an arrow D, and aforesaid lens unit 201 is located at its stop position after the completion of changing a focal length.

The elastic resistance of aforesaid torsion spring 206 is determined to be grreater than the sliding resistance of aforesaid lens unit 201 until the moment of the foregoing, therefore the balanced condition of aforesaid lever 204 caused by aforesaid torsion spring 206 remains the same and therefore, aforesaid lens unit 201 is moved in parallel keeping the state shown in the figure in the direction of an arrow D, thus the phenomenon wherein planetary gear 21 is hard to be disengaged as mentioned above is not observed yet.

However, when planetary gear 52 on aforesaid driving gear 51 makes a further revolution clockwise beyond a position shown in the figure and rotates simultaneously counterclockwise and thereby causes aforesaid driving pin 54 to make a further movement in the direction of an arrow D, aforesaid crank 205 is strongly biased clockwise because aforesaid lens unit 201 keeps its halt.

Consequently, aforesaid lever 204 also swivels clockwise against the elasticity of aforesaid torsion spring 206 and thereby it enables aforesaid driving pin 54 to move to the peak of the amount of the movement given by aforesaid planetary gear device 50 without moving aforesaid lens unit 201.

In other words, when aforesaid driving pin 54 is located at the peak position of its straight-line motion, the elastic resistance of aforesaid torsion spring 206 has a maximum value and when a method for stopping the lens sliding by cutting the power source for the motor under aforesaid state, there is usually brought a phenomenon that the engaging pressure between aforesaid planetary gear 21 and aforesaid lens driving gear 41 takes its maximum value and disengaging between them becomes difficult as mentioned before.

In the invention, therefore, plate cam 211 is provided on the axis of aforesaid driving gear 51 as being in one unit with driving gear 51 as shown in FIG. 5, so that the plate cam 211 may stop the motor running when aforesaid driving pin 54 reaches the position that slightly exceeds the end position of the straight-line motion of the driving pin 54.

The notation 211a represents a pair of notches arranged symmetrically on the peripheral surface of aforesaid plate cam 211 and the notation 212 is a bell crank that is made of insulating material and is mounted around a shaft at a prescribed position and its one end depresses movable contact blade 213a of switch SE for stopping the motor and the reaction force from the movable contact blade 213a causes the other end of the bell crank 212 to contact the peripheral surface of aforesaid plate cam 211 with pressure. Incidentally, under the condition of the foregoing, aforesaid movable contact blade 213a contacts fixed contact blade 213b, thereby, aforesaid switch SE is closed and the motor keeps running.

After aforesaid lens unit 201 stops moving, aforesaid driving gear makes a further turn and when the lens unit 201 passes the peak position of its straight-line motion and enters slightly its returning motion which is opposite to the direction of an arrow D, aforesaid notch 211a causes the other end of aforesaid bell crank 212 to drop in it and thereby the bell crank 212 swivels clockwise.

Consequently, aforesaid switch 213 is opened and thereby the motor stops running and lens-sliding action is terminated. However, since aforesaid driving pin 54 is in its returning motion, though slightly, the elasticity of aforesaid torsion spring 206 actuates in the direction that agrees with the movement direction of aforesaid driving pin 54, therefore, the load of aforesaid planetary gear 21 is reduced to a great extent and thereby the engaging pressure between aforesaid lens driving gear 41 and aforesaid planetary gear 21 is also reduced and thus the phenomenon that the planetary gear 21 and lens driving gear 41 fail to disengage is prevented.

Incidentally, aforesaid function is also needed when aforesaid driving pin 54 makes its returning motion, namely when aforesaid lens unit 201 is moved in the direction opposite to that of an arrow D. In that case, notch 211a that is at a symmetrical position mentioned before actuates aforesaid switch 213 and thereby the motor stops running.

In working of the invention, when it happens by chance that the picture-taking lens is set at a long focal length and the lens barrel is in an extended position after film-rewinding is terminated by film-rewinding button 61 operated, a film-rewinding state may continue but it is impossible to cause the lens barrel to be collapsed even if aforesaid lens-sliding button 110 is operated because protrusion 66 of aforesaid film-rewinding button 61 holds stud pin 22 of aforesaid second clutch lever 19 at a fixed position and thereby it is impossible to cause aforesaid planetary gear 21 to engage with aforesaid lens-driving gear 41.

Under such condition, therefore, it is impossible to put the camera in a camera case and troublesome operations that the camera is taken out of the case and the back lid of the camera is opened and then lens-sliding is performed are needed.

In the present invention, therefore, there is provided a mechanism for switching to an action wherein aforesaid hook lever 71 of aforesaid film-rewinding button 61 may be released by the operation made from the outside of a camera without opening the back lid when film-rewinding is terminated, and thus lens-sliding is made possible.

Figure 6:
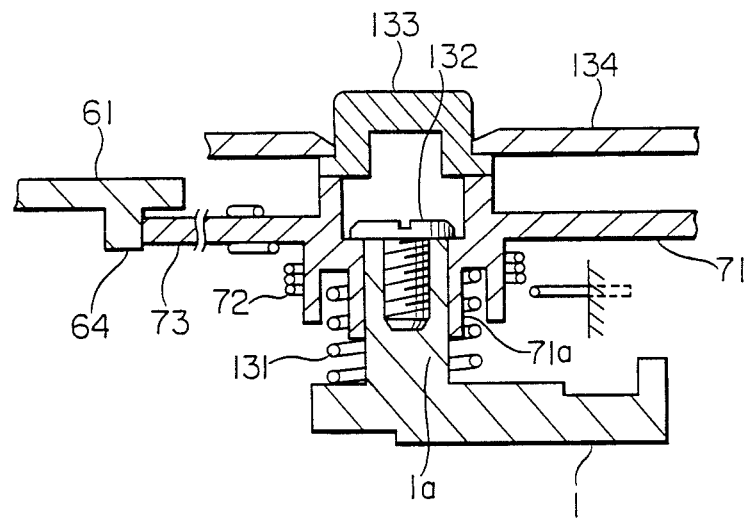
FIG. 6 shows a mechanism for switching to an action after completion of film rewinding operation.

Namely, as a principal part in FIG. 1 is shown as a sectional view in FIG. 6, aforesaid hook lever 71 is provided with a cylindrical part 71a that is in one body with the hook lever 71 on its center of rotation and the cylindrical part 71a is engaged around supporting shaft 1a planted in aforesaid bottom plate 1 so that the cylindrical part 71a can rotate around and slide along the supporting shaft 1a.

Aforesaid hook lever 71 is biased counterclockwise in FIG. 1 by aforesaid torsion spring 72 hung on the hook lever 71 and at the same time, it is biased upward by the reaction force of compression spring 131 inserted between aforesaid bottom plate 1 and the hook lever 71, but it is held by stopper screw 132 which is screwed in aforesaid supporting shaft 1a.

Further, in the space between the top of aforesaid hook lever 71 and external member 134 of a camera, there is provided push button 133 as an operating member, aforesaid hook lever 71 can be lowered against aforesaid compression spring through pushing down said push button from outside of camera.

Incidentally, aforesaid torsion spring 72 is to be given an biasing force that is enough to cause the hook lever 71 to swivel, predominating over the compression force of aforesaid compression spring 131 when aforesaid hook lever ascends.

In the constitution mentioned above, when the back lid is not opened but aforesaid push button is depressed after film-rewinding is terminated, aforesaid hook lever 71 descends while compressing aforesaid compression spring 131, and the first protrusion 73 of the hook lever 71 becomes free from contacting with the protrusion 64 of aforesaid film-rewinding button 61 and retreats downward, thereby the film-rewinding button 61 returns to the position shown in FIG. 1, resulting in the state capable of operating lens-sliding.

Incidentally, aforesaid hook lever 71 does not return to the position shown in FIG. 1 when aforesaid push button 133 continues to be pushed, but it returns to the position owing to the action of aforesaid releasing lever 81 when the back lid is opened for loading the fresh film.

In working of the invention, under the condition wherein aforesaid film-rewinding button 61 is first slided for one step in the direction of an arrow A and is locked by aforesaid hook lever 71, an accidental operation to move aforesaid lens-sliding button 110 in the direction of an arrow B also causes a motor to make a reverse turn for film-rewinding.

Aforesaid phenomenon is not preferable for the camera having the constitution wherein film-rewinding and lens-sliding are freely switched by operating only an independent and exclusive button and thereby operations on the camera are simplified.

Figure 7:
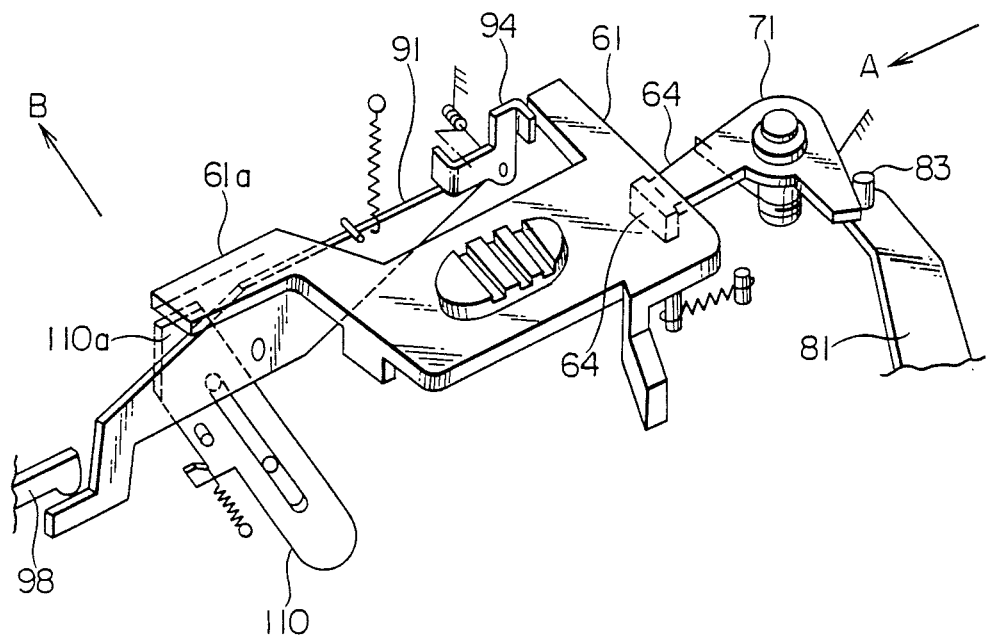
FIG. 7 shows an interlocking mechanism for preventing lens sliding operation during film rewinding operation.

In the invention, therefore, there is provided holding member 61a being connected to aforesaid film-rewinding button 61 as shown in FIG. 7, and thereby aforesaid holding member 61a is located above top portion 110a of aforesaid lens-sliding button 110 under the condition that aforesaid film-rewinding button 61 is held by aforesaid hook lever 71 and thereby the lens-sliding button 110 is prevented from sliding.

Consequently, aforesaid phenomenon is avoided and film-rewinding is performed only by a normal operation that aforesaid film-rewinding button 61 is further slided in the direction of an arrow A.

Incidentally, when a camera is in the state of film-winding, aforesaid film-rewinding button 61 is released from the holding of aforesaid hook lever 71 and is in its original position. Therefore, aforesaid holding member 61a is in its retreated position from the top of top portion 110a of aforesaid lens-sliding button 110 and it is possible to perform an operation for lens-sliding at any time.

In working of the invention, when changing a focal length by operating aforesaid lens-sliding button 110, aforesaid first clutch lever 15 swings counterclockwise and its stud 18 is held by protrusion 65 of aforesaid film-rewinding button 61, therefore aforesaid planetary gear 17 disengages from aforesaid reel gear G1 and is in the state of rotating idle.

Therefore, it is feared that aforesaid reel gear G1 is caused to rotate reversely by a tensile force of a film wound round the reel and there is caused so-called loosened film-winding in the film chamber of a camera which creates troubles in film-winding after changing a focal length or causes harmful scratches on the film.

Figure 8:
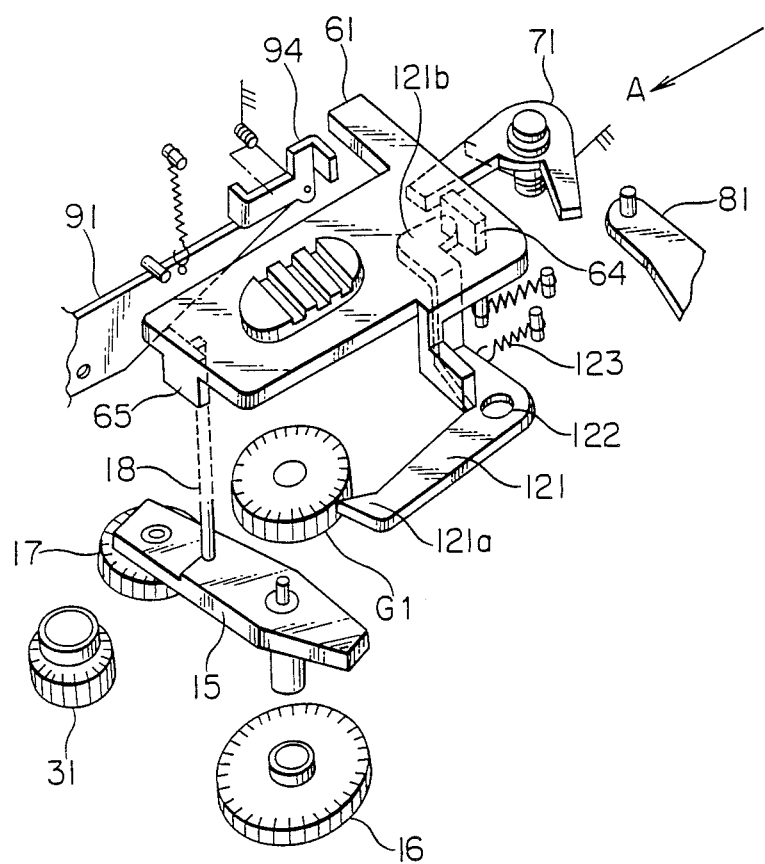
FIG. 8 shows a holding member that prevents the reverse rotation of film winding means.

In the invention, therefore, there is provided holding member 121 that prevents the reverse rotation of aforesaid reel gear G1 as shown in FIG. 8.

Namely, aforesaid holding member 121 is mounted, through its bearing hole 122, around a shaft on aforesaid bottom plate 1 being energized clockwise by tension spring 123 and is arranged so that reverse-turn-prevention claw 121a on its one end engages with a tooth-form portion of aforesaid reel gear G1 and actuating portion 121b on the other end thereof takes a position slightly apart from protrusion 64 of aforesaid film-rewinding button 61.

By means of aforesaid reverse-turn-prevention claw 121a, the counterclockwise rotation of aforesaid reel gear G1, namely, the reverse rotation thereof is prevented but the clockwise rotation is possible and film-winding can be performed without troubles.

Aforesaid state is kept even when a focal length is being changed by the operation of aforesaid lens-sliding button 110, consequently, the film slack or loosened film-winding state caused by disengaging of aforesaid planetary gear 17 may be prevented.

Incidentally, for film-rewinding, when aforesaid film-rewinding button 61 is slided in the direction of an arrow and protrusion 64 is caused to be held by hook lever 71, the opposite side face of the protrusion 64 pushes actuating portion of aforesaid holding member 121 and brings the holding member 121 to the state wherein it has been swiveled counterclockwise. Therefore, aforesaid reverse-turn-prevention claw 121 retreats from the position of engaging with aforesaid reel gear G1 and thereby the reel gear G1 gets in a state capable of rotating reversely and film-rewinding is performed smoothly.

Figure 9:
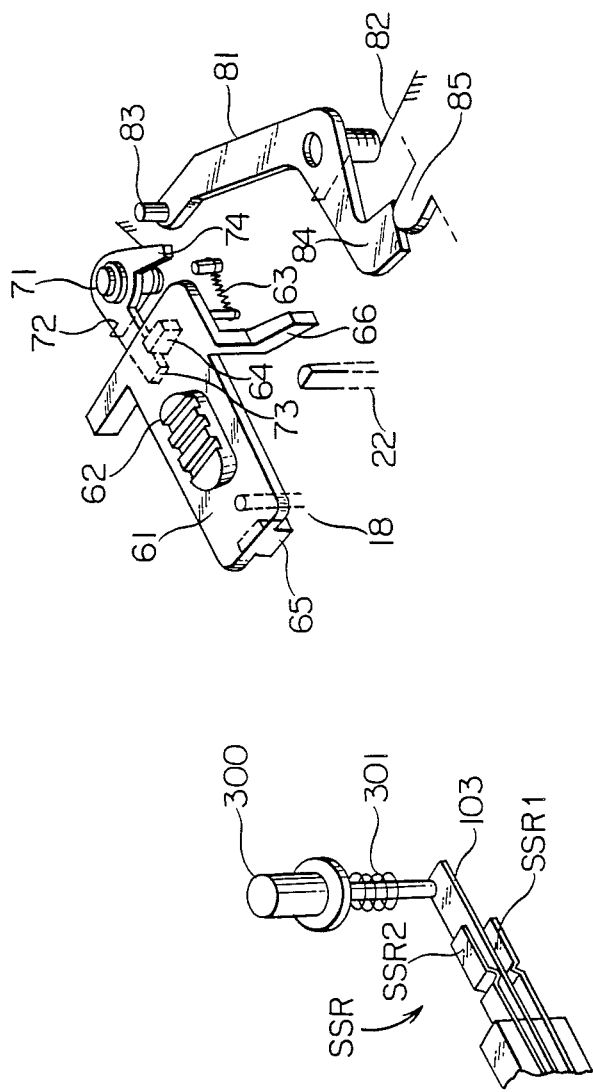
FIG. 9 shows other example relating to a switch mechanism.

Other example relating to the switch mechanism of the invention is shown in FIG. 9. In FIG. 9, switch lever 91 and lens-sliding button 110 both in FIG. 1 are eliminated and operation button 300 that is capable of being operated from outside and is kept by compression spring 301 at the position apart from contact blade 103 is newly added. This mechanism enables rotation-changeover-switch SSR to be operated directly from outside. Namely, it is possible to cause the motor to run reversely for lens-sliding through the power-transmission mechanism in FIG. 1 by operating aforesaid operation button 300 without operating film-rewinding button 61, and by operating aforesaid operation button 300 after operating film-rewinding button 61, it is possible to cause the motor to run reversely likewise for film-rewinding through the power-transmission mechanism in FIG. 1.

As stated above, in a motor-driven camera of the present example, both film-rewinding and other camera action, namely, film-rewinding and lens-sliding actions in the present example can be performed by switching the power-transmission mechanism on the reverse turn of a motor, and it is characterized by that any of both actions mentioned above can be started by operating directly the same switch. Consequently, it is not necessary to provide a plurality of switches or to provide a mechanism member that is needed when a switch is operated by a film-rewinding button, which causes the structure thereof to be advantageous constitution from the viewpoints of a space and a cost.

Figure 10:
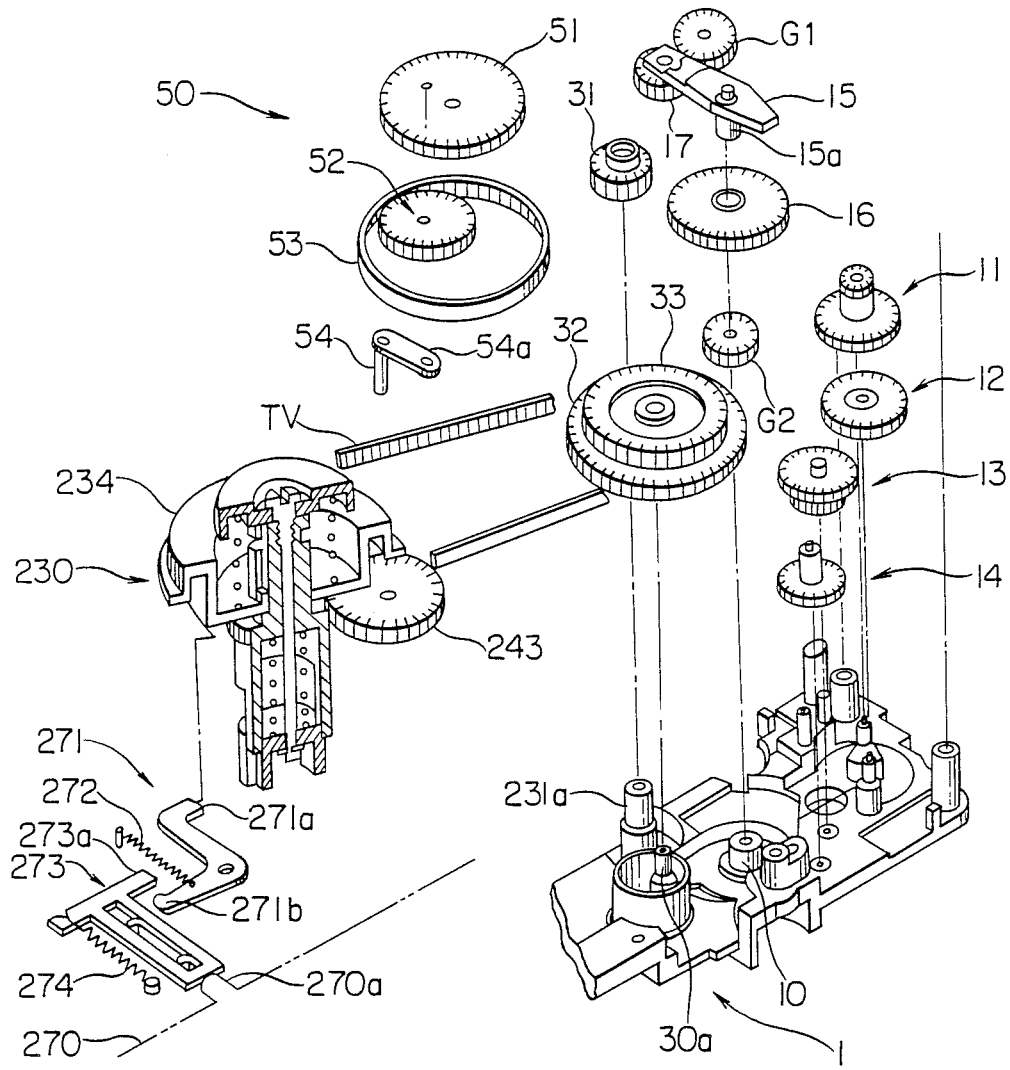
FIG. 10 and FIG. 11 show other example of a power transmission mechanism of the invention.
Figure 11:
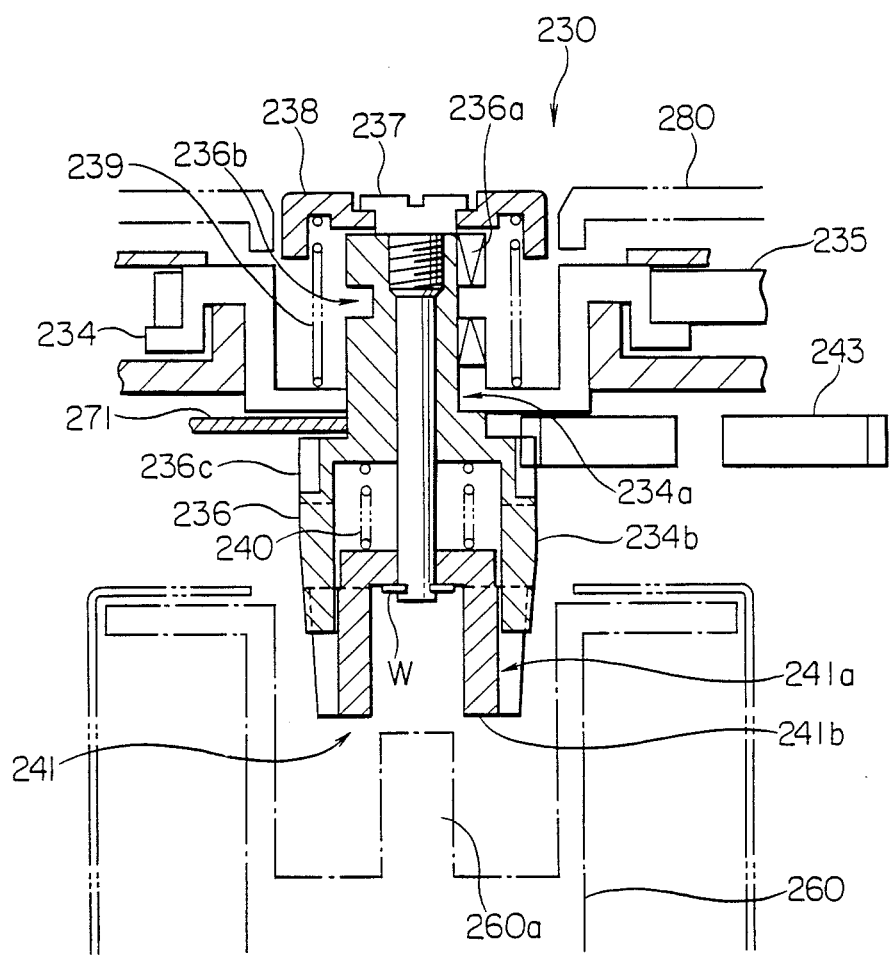

FIG. 10 and FIG. 11 show other example of a power-transmission mechanism of the invention. The figure shows a perspective view wherein the bottom plate portion of a camera body is viewed from the back lid side and each structural member is illustrated on its developed position for mounting.

The notation 1 represents a bottom plate composing the bottom section of a camera body and it is connected, after each structural member shown in the figure is assembled thereon, to the camera body and thereby each driving system is connected functionally.

The notations 11, 12 and 13 are a combination of a large gear and a small gear united in one and each of them is rotatably mounted on a shaft or in a bushing on aforesaid bottom plate and they represent a reduction gear train wherein a gear (not illustrated) on the motor shaft engages with a large gear of gear 11 and a small gear of gear 11 engages with a large gear of gear 12 and further a small gear of gear 12 engages with a large gear of gear 13 successively.

The notation 15 is a clutch lever mounted around the shaft 10 on aforesaid bottom plate and on the rotation center portion 15a thereof, gear 16 that engages with a small gear of aforesaid gear 13 is mounted and on the edge portion thereof, planetary gear 17 that engages with the gear 16 is mounted.

Namely, aforesaid clutch lever 15 serves as the first clutch that causes aforesaid planetary gear 17 to revolve clockwise or counterclockwise and thereby transmits power to reel gear G1 connected to the film-winding shaft as the first power-transmission system or to film-rewinding gear 31 mounted around shaft 231a on bottom plate 1 as the second power-transmission system, when the direction of rotation of aforesaid gear 16 is changed by causing a motor to make a regular turn or a reverse turn.

G2 is a sprocket gear that is mounted around a shaft of a camera body and engages with aforesaid gear 13 through intermediate gear 14 and its counterclockwise rotation is transmitted to the sprocket (not illustrated) through a one-way clutch (not illustrated).

Therefore, the film is taken up by aforesaid sprocket and by the film-winding shaft (not illustrated) connected frictionally to aforesaid reel gear G1.

The notation 32 represents a large gear for film-rewinding mounted around shaft 30a on bottom plate 1 and it engages with aforesaid film-rewinding gear 31, while pulley 33 provided on the axis of aforesaid film-rewinding large gear 32 to be in one unit with it rotates pulley 234 of film-rewinding shaft unit 230 in the same direction through timing belt TV.

FIG. 11 shows the constitution of aforesaid film-rewinding unit 230 in detail, and 236 is a driving shaft that is inserted in the rotation center of aforesaid pulley 234 to be movable axially and it is supported at the illustrated position being biased upward by the action of compression spring 239 located between push button 238 fixed by screw shaft 237 at its top and aforesaid pully 234.

On the upper peripheral surface of aforesaid driving shaft 236, there is provided axially at least on key way 236 in which key 234a is inserted and form protrusion against the internal peripheral surface of aforesaid pulley 234 and then engages with it in a slidable way, thereby aforesaid driving shaft 236 can rotate, even when it moves downward, together with aforesaid pulley 234.

The lower part of aforesaid driving shaft 236 forms a pair of rectangular protrusions 234b arranged symmetrically on the peripheral surface of the shaft 236, key ways 241a of film-rewinding claw 241 that is held by stopper ring W attached to aforesaid screw shaft 237 and is biased downward by compression spring 240 engage with the protrusion 234b in a slidable manner. Incidentally aforesaid film-rewinding claw 241 also forms symmetrically on the peripheral surface at its lower portion a pair of protrusions 241b engaging with film-winding shaft 260 of a cartridge and the protrusions 241b are exposed in the film cartridge chamber of a camera and aforesaid key ways 241a are provided on the outer peripheral surface of the protrusion 241b.

Further, aforesaid driving shaft 236 is provided on its peripheral surface at its upper portion the ring-shaped groove 236b that crosses aforesaid key way 236a and clutch gear portion 236c is further formed on a part of a peripheral surface at the lower part of aforesaid pulley 234 and aforesaid clutch gear portion 236c serves as a second clutch capable of engaging with or disengaging from gear 243 that is a member for driving source for the camera action other than film-transportation in the invention, namely for lens-sliding performed in changing a focal length.

Aforesaid gear 243 is so arranged as to be able to transmit to planetary gear mechanism 50 and when the rotation of aforesaid pulley 234 causes driving gear 51 to rotate through aforesaid gear 243, planetary gear 52 connected eccentrically to the driving gear 51 engages with internal gear 53 having its pitch circle diameter that is twice that of aforesaid planetary gear 52 and thereby revolves and rotates simultaneously and causes driving pin 54 fixed at a position corrsponding to a pitch circle diameter of aforesaid planetary gear 52 through supporting plate 54a to make a straight-line motion of the stroke corresponding to the pitch circle diameter of aforesaid internal gear 53 from the illustrated position in the direction of an optical axis of a camera, and lens-sliding is performed by utilizing the action of aforesaid straight-line motion.

On the other hand, 271 is an L-shaped lock lever biased clockwise by tension spring 272 and its end portion 271a is pressed against the upper peripheral surface of aforesaid gear portion 236c of aforesaid driving shaft 236, while the other end portion 271b is keeping some distance against the face of protrusion 273a of releasing plate 273 capable of being slided by tension spring 274. Aforesaid releasing plate 273, when the back lid 270 is closed against a camera body, is pressed by protrusion 270a of aforesaid back lid 270 and is in an illustrated position against aforesaid tension spring 274. Incidentally, the width of end portion 271a of aforesaid lock lever 271 is larger than the width of key way 236a provided on aforesaid driving shaft 236, thus it is prevented, even when aforesaid driving shaft 236 moves downward, that aforesaid lock lever 271 engages with aforesaid key way 236a and thereby aforesaid pulley 234 is prevented from rotating.

Further, in the driving mechanism of the present example, there is provided a switch (not illustrated) for reverse turn of a motor which can be actuated freely by a button for the switch arranged outside of a camera and also by aforesaid driving shaft 236 moved downward by depressing aforesaid push button 238 provided in external member 280, in addition to the switch for regular turn of a motor actuated by a release operation.

Each operation of film-winding, film-rewinding and lens-sliding as well as each action thereof in the present example will be explained as follows.

FIG. 10 shows the condition wherein a switch for regular turn of a motor is actuated by a release operation on a camera and thereby the motor makes a regular turn and consequently aforesaid gear 16 rotates clockwise and causes aforesaid clutch lever 15 connected frictionally to aforesaid gear 16 to swivel also clockwise and thereby aforesaid planetary gear 17 is engaged with reel gear G1 of the film-winding shaft, and under such condition, planetary gear 17 is rotated counterclockwise by aforesaid gear 16 and thereby aforesaid reel gear G1 is rotated clockwise.

At the same time, a regular turn of a motor causes aforesaid sprocket gear G2 to rotate clockwise, therefore, the film transported by a joint action of aforesaid sprocket gear G2 and aforesaid reel gear G1 is taken up by the film-winding shaft (not illustrated) frictionally connected to aforesaid reel gear G1 and the signal detected from the rotation of sprocket gear G2 causes the motor to stop running for the film-winding length equivalent to one frame of a film.

Next, when aforesaid button for the switch is pressed in FIG. 10 and thereby the switch for reverse turn is actuated to cause the motor to run reversely, aforesaid gear 16 rotates counterclockwise and thereby aforesaid clutch lever 15 is turned counterclockwise, consequently aforesaid planetary gear 17 disengages from aforesaid reel gear G1 and engages with aforesaid film-winding gear 31 which thereby is rotated counterclockwise.

Therefore, aforesaid pulleys 33 and 234 are rotated clockwise, which causes aforesaid driving shaft 236 that rotates together with aforesaid pulley 234 to rotate clockwise and aforesaid driving shaft 236 further drives aforesaid planetary gear device 50 through aforesaid gear 243.

Thus, lens-sliding for changing a focal length is performed and the signal detected from a half turn of aforesaid driving gear 51 stops the rotation of the motor. During the sequence of aforesaid actions, film-rewinding claw w241 at the lower end of aforesaid driving shaft 36 is in a position that it does not engage with film-winding shaft 260 of the film cartridge, therefore aforesaid film-rewinding claw 241 rotates idle performing no film-rewinding and thus lens-sliding only is performed as stated before. Namely, aforesaid button for the switch is to be used as an exclusive button for lens-sliding only.

On the other hand, after completing photographing for all the frames in a film, when aforesaid push button 238 continues to be pushed toward the inside of a camera until the moment when ring-shaped groove 236b of aforesaid driving shaft 236 reaches end portion 271a of aforesaid lock lever 271 and engages with it, clutch gear portion 236c disengages firstly from aforesaid gear 243 in the course thereof and then film-rewinding claw 241 at the lower end enters the state that it engages with key 260a of film-winding shaft 260 and concurrently with that, aforesaid switch for reverse turn of a motor is actuated through a member.

Consequently, aforesaid pulley 234, driving shaft 236 and thereby aforesaid film-rewinding claw 241 all rotate clockwise and act to transport an exposed film wound around a film-winding shaft back to the film cartridge. In this case, the film-winding shaft causes aforesaid reel gear G1 disengaged from planetary gear 17 to rotate idle, while the sprocket is caused by a one-way clutch provided between aforesaid sprocket gear G1 and the sprocket to be freely rotated reversely and thereby film-rewinding may smoothly be performed.

Namely, aforesaid push button 238 is to be used as an exclusive switch button for film-rewinding alone and its film-rewinding action is continued by aforesaid driving shaft 236 kept to its pushed-down position by being held by aforesaid lock lever 271.

Thus, film-rewinding is continued and the signal of the termination of film-rewinding obtained from the result of the detection of film existence causes the motor to stop running, thereafter, when back lid 270 of a camera is opened clockwise and its protrusion 270a is retreated, aforesaid releasing plate 273 is caused by strong tension spring 274 to follow toward the side of back lid 270 and causes aforesaid lock lever 271 to swivel counterclockwise. Therefore, end portion 271a of aforesaid lock lever 271 disengages from ring-shaped groove 236b of aforesaid driving shaft 236 and the driving shaft 236 automatically ascends and returns to the illustrated position, causing film-rewinding claw 241 to disengage from key 260a of aforesaid film-winding shaft 260 to ascend for disconnection of the transmission of the rotation.

Incidentally, while aforesaid driving shaft 236 is being pushed in, when the end surface of film-rewinding claw 241 is in a position of rotation that it hits the end surface of key 260a of film-winding shaft 260, aforesaid film-rewinding claw 241 cannot engage with aforesaid key 260a immediately but as film-rewinding claw 241 swivels after the start of film-rewinding action, the film-rewinding claw 241 can be caused by the action of compression spring 240 to be in an engaging condition.

As stated above, the driving mechanism of a camera of the present example enables the camera action other than film-transportation, namely the action of lens-sliding in the present example to be performed by the driving system for film-rewinding, resulting in that the rotation of a motor only needs to be changed by a single planetary gear to a regular turn or to a reverse turn for three strands of driving systems of film-winding, film-rewinding and lens-sliding to be performed with their mechanisms which are simplified to a great extent.

Further, since the film-rewinding claw to be used for the driving mechanism of a camera of the invention is so constituted that it moves without fail to the position where it is disengaged from the film cartridge when the back lid is opened, it is very easy to unload the film cartridge from or load it in a camera, which is an advantageous point.

Incidentally, a clutch lever is used in the present example as a means for switching the direction of transmission for the driving force of a motor by means of a regular turn and a reverse turn of a motor but it is possible to use, in place of the clutch lever, the combination of two sets of one way clutches one of which is a one-way clutch (e.g. a spring clutch0 that transmits power only when the motor makes a regular turn and the other is one capable of transmitting power only when the motor makes a reverse turn.

As explained above, the driving mechanism of the present example is constituted so that a changeover of the power-transmission system to either one of film-winding and a group of other two kinds of camera actions is performed through the first clutch first of all, and a changeover to either one of film-rewinding and other camera action is performed through the second clutch provided in the power transmission system of the next step, and in spite of a single motor that performs multifunction actions, the mechanism is simple and the number of erroneous actions is small.

Incidentally, the present invention is not limited to the examples explained above but it is possible for the invention to include various types of variations. In the present example, for example, a lens-sliding action is performed as the action other than film-transportation, an action for opening and closing a lens cover or an action for moving a flash light may also be performed. And a plurality of motor can be used as a means for causing driving force in the present invention.

The present invention provides a multi-function and small-sized camera capable of selecting freely an action of film-rewinding and an action of changing a focal length of a picture-taking lens in addition to an action of film-winding, with the aid of a simple operation and a single motor built in the camera.

What is claimed is:

1. A motor driven camera device comprising
a reversible motor capable of effecting a driving force in a first and second turning direction,
a winding means for performing a film winding in the first turning direction,
a rotation-reciprocation converting means for performing a reciprocative camera action in the second turning direction, p1 a switch means for starting said motor in the first turning direction in response to a first manual input designating film winding, or in the second turning direction in response to a second manual input designating the reciprocative camera action, and
a transmitting means for transmitting the driving force of said motor, said transmitting means comprising a transmitting direction change means for changing the transmitting direction of the driving force in response to the turning direction of said motor wherein transmitting means submits the driving force to said winding means in said first turning direction and transmits the driving force to said rotation-reciprocation converting means in said second turning direction, said camera device further comprising
a rewinding means for performing a film rewinding in said second turning direction, and
a mechanism change means for shifting a transmitting mechanism of said tranmitting means in response to a third manual input designating film rewinding, said switch means starting said motor in said second turning direction in response to said third manual input so that said shifted transmitting mechanism of said transmitting means transmits the driving force to said rewinding means in said second turning direction.

2. The motor driven camera device of claim 1 wherein said reciprocative camera action is a lens shifting operation.

3. The motor driven camera device of claim 1 wherein said reciprocative camera action is a strobe setting operation.

4. The motor driven camera device of claim 1 wherein said reciprocative camera action is a lens cover setting operation.

5. The motor driven camera device of claim 1 wherein said driving force-direction change means comprises a rotatable clutch lever which rotates in accordance with said first or second turning direction, and a clutch means capable of being actuated in response to the second manual operation.

6. The motor driven camera device of claim 5 wherein said clutch means comprises a driving shaft capable of axial movement,
   said driving shaft has two sets of couplings wherein one is capable of connecting with said camera action means and the other is capable of connecting with said film rewinding means, and
   wherein said mechanism change means is adapted to regulate a position of the driving shaft so as to change the transmitted driving force direction in response to the second manual operation from said camera action means to said rewinding means and from said rewinding means to said camera action means.

7. The camera of claim 2,
   wherein said rotation-reciprocation converting means converts rotating motion of said motor to straight line-reciprocating motion and carries out lens shifting by utilizing said reciprocating motion,
   wherein said conversion means comprises a rotation member and a reciprocation member, and
   said rotating motion is stopped after rotation member passing over the peak point thereof corresponding with the end position of said reciprocation member.

8. The camera of claim 7,
   wherein said rotation member has an excess stroke resulting from having longer circle stroke than one corresponding to the stroke of said reciprocation member, and
   there is provided an elastic member between said rotation member and reciprocation member,
   whereby said elastic member allows said rotation member to rotate on said excess stroke while keeping said reciprocation member at end position thereof.

9. The camera of claim 2,
   wherein there are provided a stop means preventing said film winding means from turning to the reverse direction thereof during said lens shifting means being acting, and a means for releasing said stop means from said preventing action during said film rewinding means being acting.

10. The camera of claim 2,
    wherein there is provided a means for actuating said mode change means interlockingly with open-close motion of back lid,
    whereby power transmission means of said motor is changed from being capable of connecting with film rewinding means to being capable of connecting with lens shifting means.

11. The camera of claim 10,
    wherein there is further provided a means for actuating said actuation means on close condition of said back lid.

12. The motor driven camera device of claim 1 wherein said driving force-direction change means comprises a rotatable clutch lever which rotates in accordance with said first or second turning direction of said reversible motor and wherein said mechanism change means has a locking member positioned to regulate the rotation of said clutch lever thereby controlling the driving force-direction change means.

13. The motor driven camera device of claim 12 wherein said driving force-direction change means comprises two sets of said rotatable clutch levers being adapted to transmit the driving force in four different ways based upon said first or second turning direction.

14. The motor driven camera device of claim 13 wherein said winding means comprises a take-up means and a transport means connected with two of said four different ways, and
    wherein said camera action means and said rewinding means are connected with another two of said four different ways.

15. The motor driven camera device of claim 14 wherein said mechanism change means is adapted to regulate said two sets of rotatable clutch levers so as to change the transmitted driving force direction in response to the second manual operation from said camera action means to said rewinding means and from said rewinding means to said camera action means.

16. A method of operating a camera having a reversible motor capable of effecting a driving force in a first and second turning direction for performing a film winding, a film rewinding and a reciprocative camera action, said method comprising
    starting said motor in the first turning direction in response to a first manual input designating film winding, or in the second turning direction in response to a second manual input designating the reciprocative camera action, and
    transmitting the driving force to a film winding means or to a rotation-reciprocation converter for performing the reciprocative camera action in response to the turning direction of said motor through a transmitting means having a transmitting direction change means so that the driving force is transmitted to said winding means in the first turning direction and to said rotation-reciprocation converter in said second turning direction,
    said method further comprising
    shifting the transmitting mechanism of said transmitting means and starting said motor in said second turning direction in response to a third manual input designating film rewinding so that the driving force is transmitted to a film rewinding means by said shifted transmitting mechanism of said transmitting means.

17. The method of claim 16 further comprising a step of monitoring said film winding and said reciprocative camera action and controlling said motor utilizing a signal transmitted from a monitoring means.

* * * * *